US012588103B2

(12) United States Patent
Zhao

(10) Patent No.: US 12,588,103 B2
(45) Date of Patent: Mar. 24, 2026

(54) METHOD FOR MAINTAINING DRX AND/OR DTX STATE OF SIDELINK COMMUNICATION INTERFACE, AND SIDELINK COMMUNICATION TERMINALS

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 353 days.

(21) Appl. No.: 18/552,441

(22) PCT Filed: Mar. 14, 2022

(86) PCT No.: PCT/CN2022/080789
§ 371 (c)(1),
(2) Date: Sep. 26, 2023

(87) PCT Pub. No.: WO2022/206365
PCT Pub. Date: Oct. 6, 2022

(65) Prior Publication Data
US 2024/0179795 A1 May 30, 2024

(30) Foreign Application Priority Data
Mar. 29, 2021 (CN) .......................... 202110336748.9

(51) Int. Cl.
| | |
|---|---|
| *H04W 76/28* | (2018.01) |
| *H04W 28/02* | (2009.01) |
| *H04W 72/25* | (2023.01) |

(52) U.S. Cl.
CPC ....... *H04W 76/28* (2018.02); *H04W 28/0278* (2013.01); *H04W 72/25* (2023.01)

(58) Field of Classification Search
CPC . H04W 76/28; H04W 28/0278; H04W 72/25; H04W 76/14; H04W 52/0216;
(Continued)

(56) References Cited

U.S. PATENT DOCUMENTS

| | | |
|---|---|---|
| 2015/0282132 A1 | 10/2015 | Kim et al. |
| 2016/0044740 A1 | 2/2016 | Siomina et al. |

(Continued)

FOREIGN PATENT DOCUMENTS

| | | |
|---|---|---|
| CN | 107241786 A | 10/2017 |
| CN | 110876177 A | 3/2020 |

(Continued)

OTHER PUBLICATIONS

ISA State Intellectual Property Office of the People's Republic of China, International Search Report and Written Opinion Issued in Application No. PCT/CN2022/080789, Apr. 27, 2022, WIPO, 13 pages.

(Continued)

*Primary Examiner* — Afshawn M Towfighi
(74) *Attorney, Agent, or Firm* — KILPATRICK TOWNSEND & STOCKTON LLP

(57) ABSTRACT

The present application provides a method for maintaining a DRX and/or DTX state of a sidelink communication interface and sidelink communication terminals. After a sidelink communication transmitting terminal sends a scheduling request SR or a buffer status reporting BSR corresponding to a sidelink communication interface to a network device, the sidelink communication transmitting terminal updates DRX and/or DTX active time of the sidelink communication interface, and the sidelink communication transmitting terminal is in the DRX and/or DTX active time at the sidelink communication interface within a first preset time period.

20 Claims, 6 Drawing Sheets

(58) Field of Classification Search
CPC ..... H04W 88/04; H04W 92/18; H04W 40/22; H04W 8/24; H04W 52/0248; H04W 72/21; Y02D 30/70
See application file for complete search history.

(56) References Cited

U.S. PATENT DOCUMENTS

| | | | |
|---|---|---|---|
| 2016/0286601 A1 | 9/2016 | Siomina et al. | |
| 2022/0295408 A1* | 9/2022 | Hosseini | H04W 52/0235 |
| 2023/0156859 A1* | 5/2023 | Park | H04W 72/25 |
| | | | 370/329 |
| 2023/0262835 A1* | 8/2023 | Li | H04W 76/28 |
| 2023/0319951 A1* | 10/2023 | Cai | H04W 72/40 |
| | | | 370/252 |

FOREIGN PATENT DOCUMENTS

| | | | | | |
|---|---|---|---|---|---|
| CN | 111556590 A | 8/2020 | | | |
| CN | 111869314 A | 10/2020 | | | |
| WO | 2016013371 A1 | 1/2016 | | | |
| WO | 2017138378 A1 | 8/2017 | | | |
| WO | WO-2017148214 A1 * | 9/2017 | | | H04W 72/20 |
| WO | 2018064477 A1 | 4/2018 | | | |
| WO | 2018228531 A1 | 12/2018 | | | |
| WO | 2020077643 A1 | 4/2020 | | | |
| WO | 2020220853 A1 | 11/2020 | | | |
| WO | 2020258108 A1 | 12/2020 | | | |
| WO | 2021034966 A1 | 2/2021 | | | |
| WO | WO-2021119474 A1 * | 6/2021 | | | H04W 72/20 |

OTHER PUBLICATIONS

State Intellectual Property Office of the People's Republic of China, Notice of Allowance and Search Report Issued in Application No. 202110336748.9, Nov. 9, 2024, 6 pages.

Lenovo et al., "Coordination between Uu DRX and SL DRX", 3GPP TSG-RAN WG2 Meeting #113 electronic, E-meeting, Jan. 25-Feb. 5, 2021, total 5 pages, R2-2100931.

Japanese Patent Office, Notice of Allowance Issued in Application No. 2023-559081, Sep. 24, 2024, 6 pages.

Huawei et al., "Physical layer impacts of sidelink DRX", 3GPP TSG RAN WG1 #103-e, E-meeting, Oct. 26-Nov. 13, 2020, total 6 pages, R1-2008332.

Huawei et al., "Alignment between Uu DRX and SL DRX", 3GPP TSG-RAN WG2 Meeting #113 electronic, Jan. 25-Feb. 5, 2020, total 6 pages, R2-2101764.

* cited by examiner

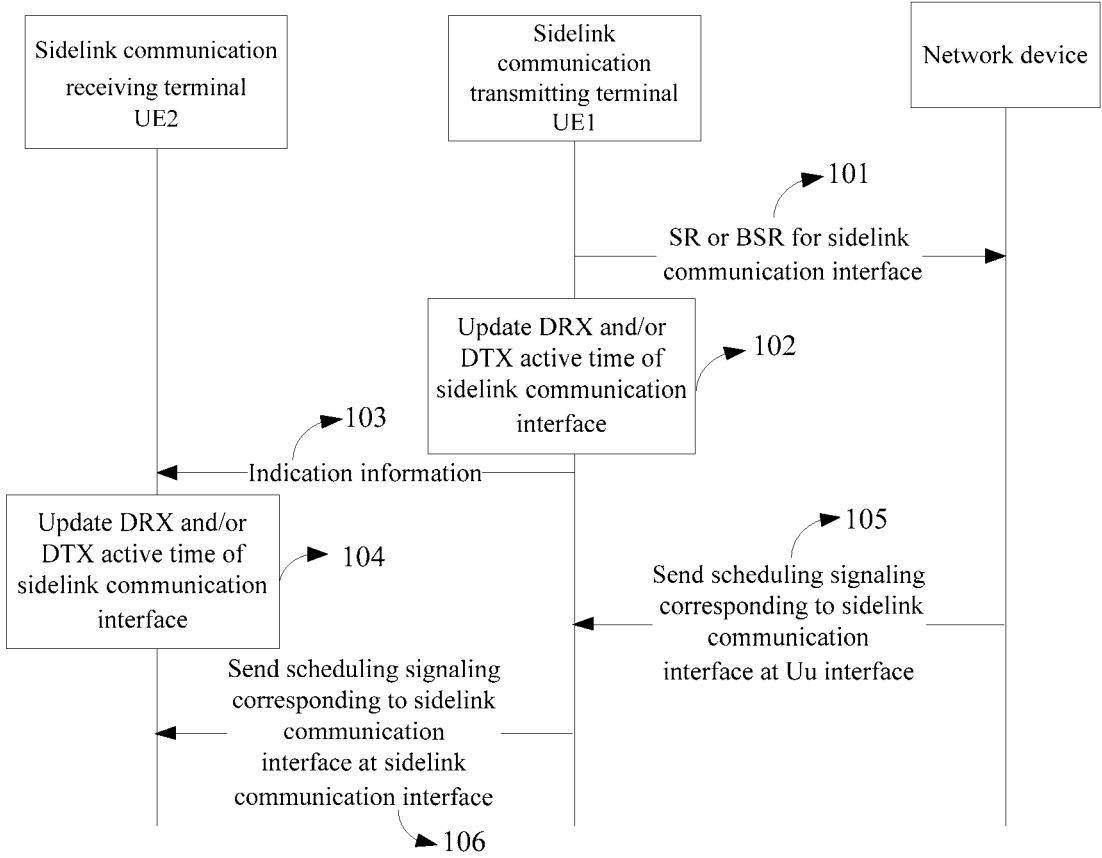

FIG. 3

After a sidelink communication transmitting terminal sends a scheduling request SR or a buffer status reporting BSR corresponding to a sidelink communication interface to a network device, the sidelink communication transmitting terminal updates DRX and/or DTX active time of the sidelink communication interface, so that the sidelink communication transmitting terminal is in the DRX and/or DTX active time at the sidelink communication interface within a first preset time period

After a sidelink communication transmitting terminal sends a scheduling request SR or a buffer status reporting BSR corresponding to a sidelink communication interface to a network device, the sidelink communication transmitting terminal updates DRX and/or DTX active time of the sidelink communication interface, so that the sidelink communication transmitting terminal is in the DRX and/or DTX active time at the sidelink communication interface within a first preset time period
⌇ 201

After the sidelink communication transmitting terminal sends indication information to the sidelink communication receiving terminal, the sidelink communication transmitting terminal updates the DRX and/or DTX active time of the sidelink communication interface, so that the sidelink communication transmitting terminal is in the DRX and/or DTX active time at the sidelink communication interface within a first preset time period
⌇ 202

FIG. 7

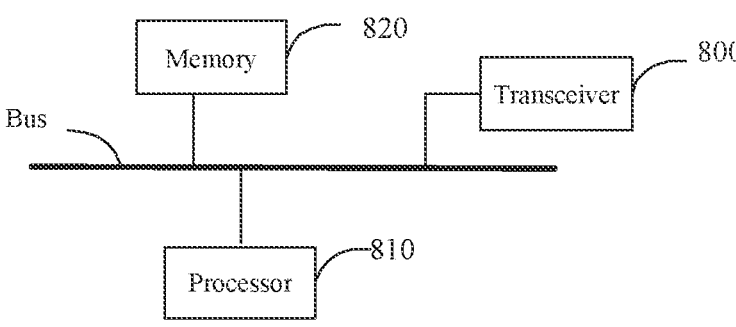

FIG. 8

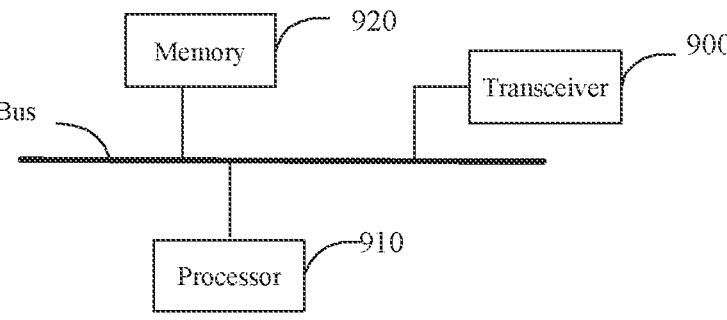

FIG. 9

METHOD FOR MAINTAINING DRX AND/OR DTX STATE OF SIDELINK COMMUNICATION INTERFACE, AND SIDELINK COMMUNICATION TERMINALS

The present application is a National Stage of International Application No. PCT/CN2022/080789, filed on Mar. 14, 2022, which claims the priority to Chinese patent application No. 202110336748.9, titled "METHOD FOR MAINTAINING DRX AND/OR DTX STATE OF SIDE-LINK COMMUNICATION INTERFACE, AND SIDE-LINK COMMUNICATION TERMINALS" and filed with the China National Intellectual Property Administration on Mar. 29, 2021. These applications are hereby incorporated by reference in their entireties.

FIELD

The present application relates to the field of communication technologies, and in particular to a method for maintaining a DRX and/or DTX state of a sidelink communication interface and sidelink communication terminals.

BACKGROUND

Sidelink communication refers to a communication mode in which terminals that are close to each other communicate via a sidelink communication interface between the terminals. A sidelink communication link between two terminals is also referred to as a sidelink (SL), and a sidelink communication interface between the two terminals is also referred to as a sidelink interface. In addition, a terminal may also communicate with a network device, a corresponding communication link therebetween being referred to as a Uu link, and a corresponding interface therebetween being referred to as a Uu interface.

In order to realize power saving of the sidelink communication interface, discontinuous reception (DRX for short) and discontinuous transmission (DTX for short) mechanisms of the sidelink communication interface are introduced for the sidelink communication interface in existing mechanisms.

SUMMARY

The present application provides a method for maintaining a DRX and/or DTX state of a sidelink communication interface and sidelink communication terminals, which are used to prevent a resource for a sidelink communication interface scheduled by a network device from falling within DRX and/or DTX inactive time of the sidelink communication interface in a time domain position, thus a waste of the resource for the sidelink communication interface can be avoided.

In one embodiment of the present application provides a method for maintaining a DRX and/or DTX state of a sidelink communication interface, including:
after a sidelink communication transmitting terminal sends a scheduling request SR or a buffer status reporting BSR corresponding to a sidelink communication interface to a network device, updating, by the sidelink communication transmitting terminal, DRX and/or DTX active time of the sidelink communication interface, and the sidelink communication transmitting terminal is in the DRX and/or DTX active time at the sidelink communication interface within a first preset time period;

where a start time of the first preset time period is a sending time of the SR or the BSR;
an end time of the first preset time period is a receiving time at which the sidelink communication transmitting terminal receives a scheduling signaling corresponding to the sidelink communication interface sent by the network device or a time at which the sidelink communication transmitting terminal sends sidelink communication interface control information SCI to a sidelink communication receiving terminal through the sidelink communication interface.

In one embodiment of the present application provides a method for maintaining a DRX and/or DTX state of a sidelink communication interface, including:
receiving, by a sidelink communication receiving terminal and through a sidelink communication interface, indication information sent by a sidelink communication transmitting terminal;
updating, by the sidelink communication receiving terminal, DRX and/or DTX active time of the sidelink communication interface according to the indication information, and the sidelink communication receiving terminal is in the DRX and/or DTX active time at the sidelink communication interface within a second preset time period;
where the second preset time period includes at least a time at which the sidelink communication receiving terminal receives, through the sidelink communication interface, sidelink communication interface control information SCI sent by the sidelink communication transmitting terminal.

In one embodiment of the present application provides a sidelink communication transmitting terminal, including a memory, a transceiver and a processor:
the memory is configured to store a computer program; the transceiver is configured to transmit and receive data under control of the processor; the processor is configured to read the computer program in the memory and execute the following operations:
after the sidelink communication transmitting terminal sends a scheduling request SR or a buffer status reporting BSR corresponding to a sidelink communication interface to a network device, updating DRX and/or DTX active time of the sidelink communication interface, and the sidelink communication transmitting terminal is in the DRX and/or DTX active time at the sidelink communication interface within a first preset time period;
where a start time of the first preset time period is a sending time of the SR or the BSR;
an end time of the first preset time period is a receiving time at which the sidelink communication transmitting terminal receives a scheduling signaling corresponding to the sidelink communication interface sent by the network device or a time at which the sidelink communication transmitting terminal sends sidelink communication interface control information SCI to a sidelink communication receiving terminal through the sidelink communication interface.

In one embodiment of the present application provides a sidelink communication receiving terminal, including a memory, a transceiver and a processor:
the memory is configured to store a computer program; the transceiver is configured to transmit and receive data under control of the processor; the processor is configured to read the computer program in the memory and execute the following operations:

receiving, through a sidelink communication interface, indication information sent by the sidelink communication transmitting terminal; updating DRX and/or DTX active time of the sidelink communication interface according to the indication information, and the sidelink communication receiving terminal is in the DRX and/or DTX active time at the sidelink communication interface within a second preset time period;

where the second preset time period includes at least a time at which the sidelink communication receiving terminal receives, through the sidelink communication interface, sidelink communication interface control information SCI sent by the sidelink communication transmitting terminal.

In one embodiment of the present application provides a sidelink communication transmitting terminal, including:

a transceiving device, configured to send a scheduling request SR or a buffer status reporting BSR corresponding to a sidelink communication interface to a network device;

an updating device, configured to update DRX and/or DTX active time of the sidelink communication interface, and the sidelink communication transmitting terminal is in the DRX and/or DTX active time at the sidelink communication interface within a first preset time period;

where a start time of the first preset time period is a sending time of the SR or the BSR;

an end time of the first preset time period is a receiving time at which the sidelink communication transmitting terminal receives a scheduling signaling corresponding to the sidelink communication interface sent by the network device or a time at which the sidelink communication transmitting terminal sends sidelink communication interface control information SCI to a sidelink communication receiving terminal through the sidelink communication interface.

In one embodiment of the present application provides a sidelink communication receiving terminal, including:

a transceiving device, configured to receive, through a sidelink communication interface, indication information sent by a sidelink communication transmitting terminal;

an updating device, configured to update DRX and/or DTX active time of the sidelink communication interface according to the indication information, and the sidelink communication receiving terminal is in the DRX and/or DTX active time at the sidelink communication interface within a second preset time period;

where the second preset time period includes at least a time at which the sidelink communication receiving terminal receives, through the sidelink communication interface, sidelink communication interface control information SCI sent by the sidelink communication transmitting terminal.

In one embodiment of the present application provides a processor-readable storage medium which stores a computer program therein, and the computer program is used to cause a processor to execute the method according to any one of the embodiments.

In one embodiment of the present application provides a computer program product including a computer program, and when the computer program is executed by a processor, steps of the method according to any one of the embodiments are implemented.

According to the method for maintaining a DRX and/or DTX state of a sidelink communication interface and the sidelink communication terminals provided by the present application, a sidelink communication transmitting terminal updates DRX and/or DTX active time of a sidelink communication interface after the sidelink communication transmitting terminal sends a scheduling request SR or a buffer status reporting BSR corresponding to the sidelink communication interface to a network device, and the sidelink communication transmitting terminal is in the DRX and/or DTX active time at the sidelink communication interface within a first preset time period.

It should be understood that what is described in the SUMMARY section above is not intended to limit key or important features of embodiments of the present disclosure, nor is it intended to limit the scope of the present disclosure. Other features of the present disclosure will be easily understood through the following description.

BRIEF DESCRIPTION OF DRAWINGS

In order to describe the embodiments in the present application more clearly, drawings that need to be used in the description of embodiments will be introduced briefly in the following.

FIG. 3 is a signaling diagram of a method for maintaining a DRX and/or DTX state of a sidelink communication interface provided by the present application.

FIG. 4 is a schematic flow diagram of a method for maintaining a DRX and/or DTX state of a sidelink communication interface provided by the present application.

FIG. 7 is a schematic flow diagram of a method for maintaining a DRX and/or DTX state of a sidelink communication interface provided by the present application.

FIG. 8 is a schematic structural diagram of a sidelink communication transmitting terminal provided by the present application.

FIG. 9 is a schematic structural diagram of a sidelink communication receiving terminal provided by the present application.

DESCRIPTION OF EMBODIMENTS

Exemplary embodiments of the present application are described below in conjunction with the drawings, including various details of the embodiments of the present application to facilitate understanding, which should be regarded as merely exemplary. Accordingly, various changes and modifications can be made to the embodiments described herein without departing from the scope and spirit of the present application. Also, descriptions of well-known functions and structures are omitted in the following description for clarity and conciseness.

It should be noted that the methods and the apparatuses corresponding thereto are based on the same application concept. Since the methods and the apparatuses solve the problem with similar principles, reference can be made to each other for the embodiment of the apparatuses and the methods, and the repetition will not be repeated.

The embodiments of the present application may be applied to various wireless communication systems.

For example, the applied system may be a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include terminal devices and network devices. The systems may also include a core network portion such as an evolved packet system (EPS), a 5G system (5GS), etc.

Sidelink communication refers to a terminal-to-terminal communication between terminals that are close to each other. A sidelink communication link between two terminals is also referred to as a sidelink, and a sidelink communication interface between the two terminals is also referred to as a sidelink interface. In addition, a terminal may also communicate with a network device, a corresponding communication link therebetween being referred to as a Uu link, and a corresponding interface therebetween being referred to as a Uu interface. In order to realize power saving of the sidelink communication interface, DRX and DTX mechanisms of the sidelink communication interface are introduced for the sidelink communication interface in existing mechanisms.

Figure 1:
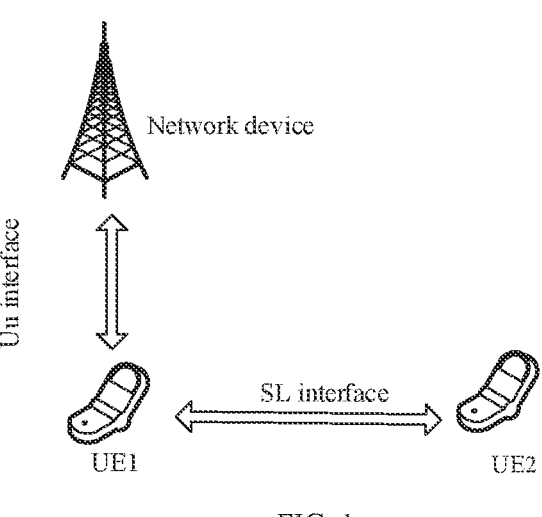
FIG. 1 is a communication network architecture for sidelink communication provided by the present application.

FIG. 1 is a communication network architecture for sidelink communication provided by the present application. As shown in FIG. 1, the communication network architecture includes at least two sidelink communication terminals UE1 and UE2, and a network device. The sidelink communication terminal UE1 may be used as a transmitting terminal in sidelink communication, and the sidelink communication terminal UE2 may be used as a receiving terminal in sidelink communication.

Also, the sidelink communication terminal in FIG. 1, which is also referred to as a terminal device, may refer to a device that provides voice and/or data connectivity to users, a handheld device with a wireless connection function, or other processing devices connected to a wireless modem, etc.

In different systems, the name of the terminal device may be different. For example, in a 5G system, the terminal device may be called user equipment (UE). A wireless terminal may communicate with one or more core networks (CNs) via a radio access network (RAN). The wireless terminal device may be a mobile terminal device such as a mobile phone (or called a "cellular" phone), and a computer with a mobile terminal device, for example, a portable, pocket-sized, handheld, computer built-in, or vehicle-mounted mobile device, which exchanges voice and/or data with the radio access network.

The wireless terminal device also may be, for example, a personal communications service (PCS) phone, a cordless phone, a session initiated protocol (SIP) phone, a wireless local loop (WLL) station, a personal digital assistant (PDA) or other devices. The wireless terminal device may also be called a system, a subscriber unit, a subscriber station, a mobile station, a mobile, a remote station, an access point, a remote terminal, an access terminal, a user terminal, a user agent, and a user device, which are not limited in the embodiments of the present application.

The network device in FIG. 1 may include a base station. The base station may include a plurality of cells providing services to the terminal. Depending on a specific application, the base station may also be called an access point, or a device in the access network that communicates with a wireless terminal device through one or more sectors over an air interface, or other names. The network device may be used to interchange a received air frame with an Internet protocol (IP) packet, and may act as a router between the wireless terminal and the rest of the access network, where the rest of the access network may include an Internet protocol communication network. A positioning server of the network device may also coordinate the management of attributes of the air interface.

As shown in FIG. 1, an SL interface is used for sidelink communication between the sidelink communication terminal UE1 and the sidelink communication terminal UE2, and a Uu interface is used for sidelink communication between the sidelink communication terminal UE1 and the base station of the network device. Generally, the SL interface and the Uu interface independently maintain their own DRX and/or DTX states respectively. Therefore, there may be a situation where DRX and/or DTX active time of the Uu interface and that of the SL interface remain out of synchronization. This also makes it possible that when a network device performs scheduling for sidelink communication through the Uu interface, a sidelink communication resource allocated by the network device may fall within DRX and/or DTX inactive time of the sidelink communication interface in a time domain position, resulting in that the sidelink communication terminal cannot use the resource allocated by the network, thus leading to a resource waste.

Figure 2:
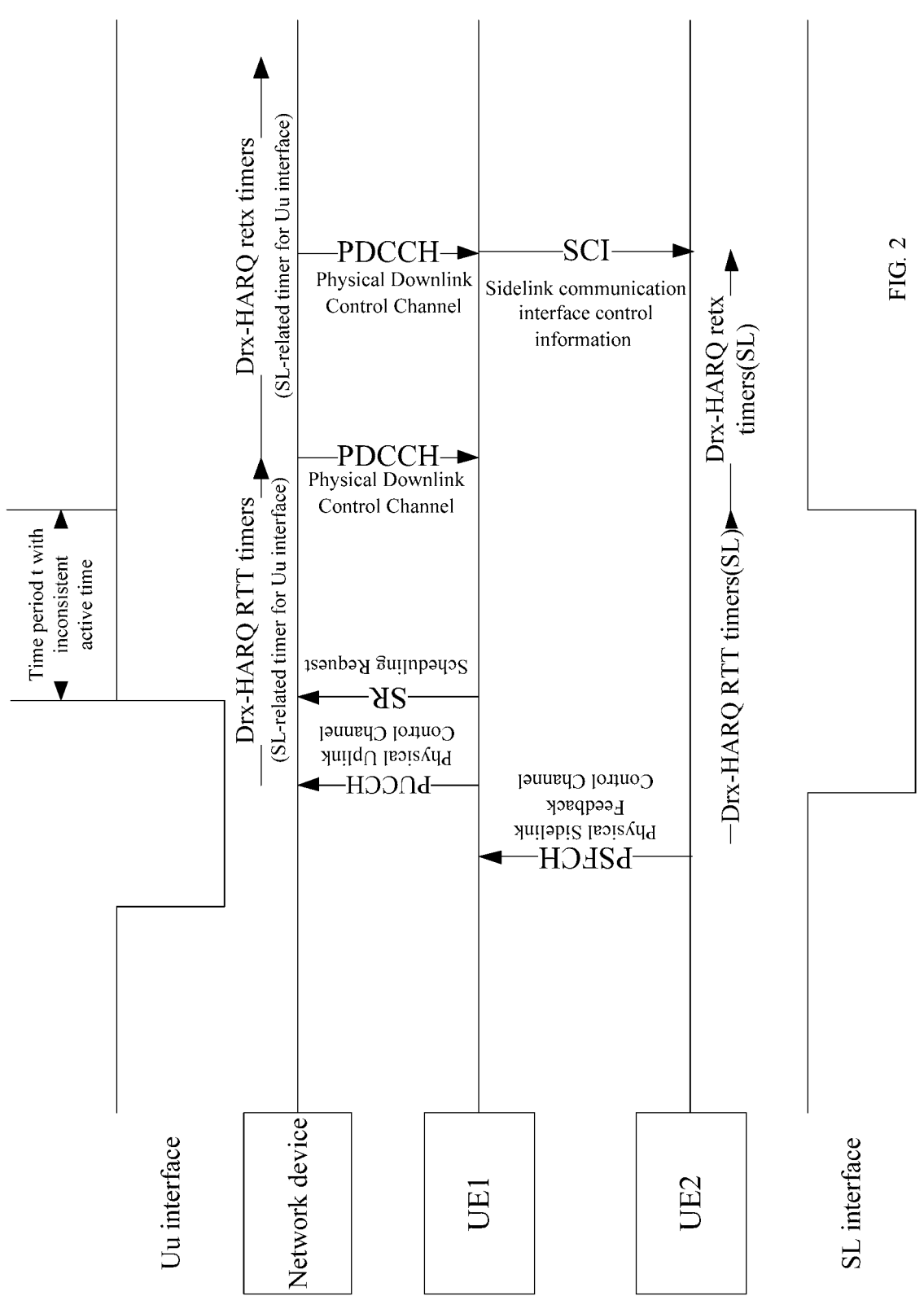
FIG. 2 is a schematic diagram of scheduling signalings for sidelink communication in a related art provided by the present application.

Specifically, FIG. 2 is a schematic diagram of scheduling signalings for sidelink communication in a related art provided by the present application. FIG. 2 shows a case of signaling interaction between respective nodes when a sidelink communication interface adopts a resource allocation mode scheduled by the network. First, when the sidelink communication transmitting terminal UE1 has a data transmission requirement at the SL interface, UE1 sends a scheduling request (SR) corresponding to the SL interface to the base station through the Uu interface. According to a Uu DRX active time maintenance rule, once UE1 sends the SR, UE1 maintains, at the Uu interface, a time period from a time of sending the SR to a time of receiving a scheduling signaling from the network device at the DRX active time of the Uu interface (a time period corresponding to t shown in FIG. 2), and the network device also maintains the DRX active time of the Uu interface during the above time period to perform resource scheduling of the SL interface.

For the SL interface, a DRX and/or DTX active state of the SL interface is determined based on a DRX and/or DTX related timer. When the Uu interface is maintained at the active time and resource scheduling for the SL interface is performed, the SL interface may enter a silent period, resulting in an SL resource allocated by the base station falling within a DRX and/or DTX inactive time period of the SL interface, which may easily lead to a resource waste.

Furthermore, when the sidelink communication terminal UE1 performs sidelink buffer status reporting (BSR for short) to the network device, a similar problem may also occur:

when the sidelink communication terminal UE1 sends a BSR to the network device, the Uu interface will be activated and enter the DRX and/or DTX active time, and the base station performs corresponding resource scheduling for the SL interface according to the received BSR; at that point, once the SL resource allocated by the base station falls within the DRX and/or DTX inactive time period of the SL interface, a resource waste will be caused.

In view of the problem mentioned above, the inventor proposes a method for maintaining a DRX and/or DTX state of a sidelink communication interface, and after a sidelink communication terminal sends an SR and/or BSR corresponding to a sidelink communication interface to a network device, the sidelink communication terminal maintains DRX and/or DTX active time at the sidelink communication interface within a given time period. In this way, it can be ensured that a sidelink communication resource allocated by a network is always within the active time of the sidelink communication interface, for avoiding the sidelink communication interface resource scheduled by the network device falling within the DRX and/or DTX inactive time period of the sidelink communication interface in the time domain position, thus the waste of the sidelink communication interface resource can be avoided.

The embodiments of the present application will be described below with reference to the drawings.

FIG. 3 is a signaling diagram of a method for maintaining a DRX and/or DTX state of a sidelink communication interface provided by the present application. As shown in FIG. 3, the method includes:

step 101, a sidelink communication transmitting terminal sends an SR or a BSR corresponding to a sidelink communication interface to a network device;

step 102, the sidelink communication transmitting terminal updates DRX and/or DTX active time of the sidelink communication interface;

step 103, the sidelink communication transmitting terminal sends indication information to a sidelink communication receiving terminal;

step 104, the sidelink communication receiving terminal updates the DRX and/or DTX active time of the sidelink communication interface according to the indication information;

step 105, the sidelink communication transmitting terminal receives, at a Uu interface, a scheduling signaling corresponding to the sidelink communication interface sent by the network device;

step 106, the sidelink communication transmitting terminal sends, at the sidelink communication interface, the scheduling signaling corresponding to the sidelink communication interface to the sidelink communication receiving terminal.

It should be noted that, in signalings shown in FIG. 3, the sidelink communication transmitting terminal UE1 and the sidelink communication receiving terminal UE2 perform sidelink communication through the sidelink communication interface SL interface, and the sidelink communication transmitting terminal UE1 performs cellular communication with the network device through the Uu interface.

In an actual communication process, the execution sequence of step 101 and step 103 is not limited. That is, as shown in FIG. 3, it is possible to first execute step 101 and then execute step 103 (the execution sequence shown in FIG. 3); it is also possible to first execute step 103 and then execute step 101 (not shown in FIG. 3); and step 101 and step 103 may also be executed synchronously (not shown in FIG. 3).

In addition, for step 102 and step 103, although FIG. 3 shows the sequence between step 102 and step 103 (step 102 is executed first and then step 103 is executed), in the actual communication process, there is no correlation between the execution timings of step 102 and the execution sequence of step 103, and the sequence of step 102 and step 103 shown in FIG. 3 does not constitute any limitation to this solution.

Specifically, in the communication process, after the network device receives the SR and/or BSR corresponding to the sidelink communication interface initiated by the sidelink communication transmitting terminal UE1 to the network device, its Uu interface will remain within the DRX and/or DTX active time, and at that point, the network device will issue the scheduling signaling corresponding to the sidelink communication interface to the sidelink communication terminal UE1 through the Uu interface.

FIG. 4 is a schematic flow diagram of a method for maintaining a DRX and/or DTX state of a sidelink communication interface provided by the present application, where an execution entity of a procedure of FIG. 4 is a sidelink communication transmitting terminal.

According to FIG. 3 in combination with FIG. 4, based on network requirements, as shown in step 101, the sidelink communication transmitting terminal UE1 may send a scheduling request (SR for short) and/or a buffer status reporting (BSR for short) corresponding to the sidelink communication interface SL interface to the network device. A trigger condition for sending the SR and the BSR by the sidelink communication transmitting terminal UE1 may be based on an existing specification, and this embodiment does not impose any limitation on the trigger condition.

As shown in step 102, after the sidelink communication transmitting terminal UE1 sends the SR and/or the BSR corresponding to the sidelink communication interface SL interface to the network device, the sidelink communication transmitting terminal UE1 updates the DRX and/or DTX active time of the sidelink communication interface, and the sidelink communication transmitting terminal UE1 is in the DRX and/or DTX active time at the sidelink communication interface within a first preset time period.

A start time of the first preset time period is a sending time of the SR or the BSR; an end time of the first preset time period is a receiving time at which the sidelink communication transmitting terminal UE1 receives the scheduling signaling corresponding to the sidelink communication interface sent by the network device or a time at which the sidelink communication transmitting terminal UE1 sends sidelink communication interface control information SCI (Sidelink Control Information) to the sidelink communication receiving terminal UE2 through the sidelink communication interface.

That is to say, as an embodiment, the sidelink communication transmitting terminal UE1 needs to remain the DRX and/or DTX active time at the sidelink communication interface during the first preset time period. The first preset time period may be one of the following time periods:

(1) a time period from a time after the sidelink communication transmitting terminal UE1 sends the SR/BSR to a time before the sidelink communication transmitting terminal UE1 receives the scheduling signaling corresponding to the sidelink communication interface sent by the network device;

(2) a time period from a time after the sidelink communication transmitting terminal UE1 sends the SR/BSR to a time before the sidelink communication transmitting terminal UE1 sends the sidelink communication interface control information SCI to the sidelink communication receiving terminal UE2 through the sidelink communication interface.

In one embodiment, the sidelink communication interface control information SCI sent by the sidelink communication transmitting terminal to the sidelink communication receiving terminal through the sidelink communication interface may be SCI of a second stage. At present, the sidelink communication interface SCI includes two parts, where first stage SCI (stage-1 SCI) is used to transmit indication information of a time/frequency domain resource, and second stage SCI (stage-2 SCI) is used to carry a sidelink communication source identification, a destination identification and other information.

In an embodiment, when the sidelink communication transmitting terminal UE1 updates an active state of DRX and/or DTX of the sidelink communication interface, one of the following manners may be adopted specifically.

One is to start a first timer at a same time or after the sidelink communication transmitting terminal UE1 sends the SR or BSR corresponding to the sidelink communication interface to the network device, and the sidelink communication transmitting terminal UE1 is in the DRX and/or DTX active time at the sidelink communication interface during running of the first timer.

The time length of the first timer may be configured by a network, or specified through a specification.

Further, the above first timer is a DRX and/or DTX inactivation timer for the sidelink communication interface.

The second is to specify in a specification that a time period between a time at which the sidelink communication transmitting terminal sends the SR and/or BSR corresponding to the sidelink communication interface to the network device and a time at which the sidelink communication transmitting terminal receives the scheduling signaling corresponding to the sidelink communication interface from the network device is the DRX and/or DTX active time of the sidelink communication interface.

As shown in step 103, in order to ensure that the sidelink communication receiving terminal UE2 also remains the DRX/DRX active time (i.e., UE2 ensures the DRX/DRX active time at the sidelink communication interface before step 106) at the sidelink communication interface before receiving the sidelink communication interface control information SCI corresponding to the sidelink communication interface sent by the sidelink communication transmitting terminal UE1, the sidelink communication transmitting terminal UE1 will also send the indication information to the sidelink communication receiving terminal UE2, where indication information will be used to indicate the sidelink communication receiving terminal UE2 to maintain the DRX and/or DTX active time in a second preset time period.

That is, the sidelink communication transmitting terminal UE1 sends the indication information to the sidelink communication receiving terminal UE2 through the sidelink communication interface, and the sidelink communication receiving terminal UE2 updates the DRX and/or DTX active time of the sidelink communication interface according to the indication information, and the sidelink communication receiving terminal UE2 is in the DRX and/or DTX active time at the sidelink communication interface within the second preset time period;

where the second preset time period includes at least the time at which the sidelink communication receiving terminal UE2 receives, through the sidelink communication interface, the sidelink communication interface control information SCI sent by the sidelink communication transmitting terminal UE1.

By taking the time at which the sidelink communication transmitting terminal UE1 sends the indication information to the sidelink communication receiving terminal UE2 in step 103 being time T as an example:

the above time T (the time at which the sidelink communication transmitting terminal UE1 sends the indication information through the sidelink communication interface to the sidelink communication receiving terminal UE2) may be one of the following times.

(1) The time T at which the sidelink communication transmitting terminal sends the indication information to the sidelink communication receiving terminal through the sidelink communication interface is the sending time at which the sidelink communication transmitting terminal sends the scheduling request SR or the buffer status reporting BSR.

(2) The time T at which the sidelink communication transmitting terminal sends the indication information to the sidelink communication receiving terminal through the sidelink communication interface is before the sending time at which the sidelink communication transmitting terminal sends the scheduling request SR or the buffer status reporting BSR.

A difference value between the time at which the sidelink communication transmitting terminal sends the indication information to the sidelink communication receiving terminal through the sidelink communication interface and the sending time at which the sidelink communication transmitting terminal sends the scheduling request SR or the buffer status reporting BSR is smaller than a first time threshold.

(3) The time T at which the sidelink communication transmitting terminal sends the indication information to the sidelink communication receiving terminal through the sidelink communication interface is after the sending time at which the sidelink communication transmitting terminal sends the scheduling request SR or the buffer status reporting BSR.

A difference value between the time at which the sidelink communication transmitting terminal sends the indication information to the sidelink communication receiving terminal through the sidelink communication interface and the sending time at which the sidelink communication transmitting terminal sends the scheduling request SR or the buffer status reporting BSR is smaller than a second time threshold.

For the first time threshold and the second time threshold described above, this embodiment does not limit the magnitude relationship between the two, and their respective specific values may be determined according to actual conditions.

In an embodiment, the indication information in step 103 is sent by the sidelink communication transmitting terminal UE1 to the sidelink communication receiving terminal UE2 through a physical layer signaling or a high-layer signaling.

When the indication information is sent by the sidelink communication transmitting terminal to the sidelink communication receiving terminal through the physical layer signaling, the indication information is sent through the sidelink communication interface control information SCI, where the SCI does not include scheduling information of the sidelink communication resource, and is only used to prolong the time when the sidelink communication receiving terminal is in the DRX and/or DTX active time at the sidelink communication interface.

When the indication information is sent by the sidelink communication transmitting terminal to the sidelink communication receiving terminal through the high-layer signaling, the indication information may be sent based on a MAC CE (Media Access Control Element Control) or RRC (Radio Resource Control) signaling of the high-layer signaling. In addition, the high-layer signaling may be a newly introduced signaling, or may also be an existing signaling with an IE (Information Element) being added, which is not limited in the present application.

In an embodiment, in order to ensure that the indication information can be effectively sent to the sidelink communication receiving terminal, the indication information is sent by the sidelink communication transmitting terminal when the sidelink communication interface is in the DRX and/or DTX active time.

In an embodiment, in order to save signaling overhead, a trigger condition for sending the indication information is that the sidelink communication transmitting terminal predicts that the sidelink communication receiving terminal will enter a DRX and/or DTX silent period before receiving the SCI.

Whether the sidelink communication receiving terminal UE2 enters the DRX and/or DTX silent period may be determined by a state of running of a timer related to DRX and/or DTX of the sidelink communication interface of the sidelink communication receiving terminal UE2. For example, when the related timer is in a non-running state, the sidelink communication receiving terminal UE2 is in the DRX and/or DTX silent period of the sidelink communication interface.

Figure 5:
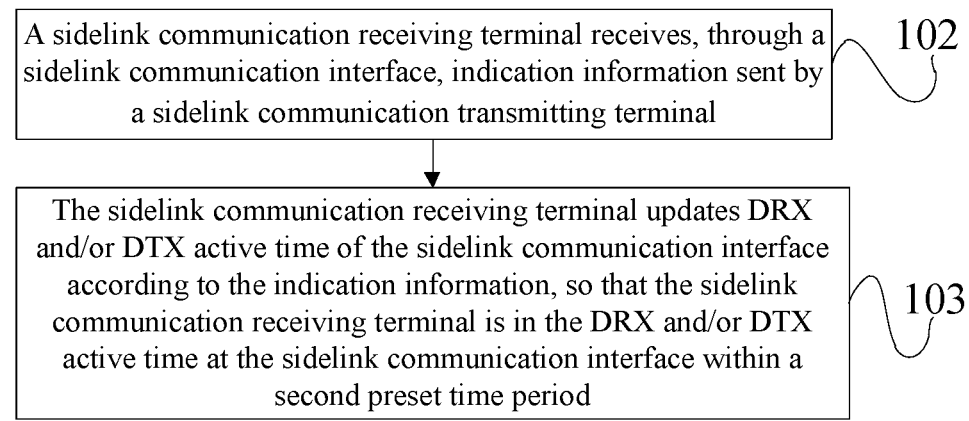
FIG. 5 is a schematic flow diagram of another method for maintaining a DRX and/or DTX state of a sidelink communication interface provided by the present application.

FIG. 5 is a schematic flow diagram of another method for maintaining a DRX and/or DTX state of a sidelink communication interface provided by the present application, where an execution entity of a procedure in FIG. 5 is a sidelink communication receiving terminal.

With reference to FIG. 3 in combination with FIG. 5, after the sidelink communication transmitting terminal UE1 sends the indication information to the sidelink communication receiving terminal UE2, that is, after the sidelink communication receiving terminal UE2 receives the indication information sent by the sidelink communication transmitting terminal UE1, as shown in step 104, the sidelink communication receiving terminal UE2 updates the DRX and/or DTX active time of the sidelink communication interface, and the sidelink communication receiving terminal UE2 is in the DRX and/or DTX active time at the sidelink communication interface within the second preset time period. The second preset time period includes at least the time at which the sidelink communication receiving terminal UE2 receives, through the sidelink communication interface, the sidelink communication interface control information SCI sent by the sidelink communication transmitting terminal UE1.

In an embodiment, the sidelink communication interface control information SCI that is sent by the sidelink communication transmitting terminal and received by the sidelink communication receiving terminal through the sidelink communication interface is SCI of a second stage. Similar to the SCI in the foregoing embodiments, the current sidelink communication interface SCI includes two parts, where a first stage SCI (stage-1 SCI) is used to transmit indication information of a time/frequency domain resource, and a second stage SCI (stage-2 SCI) is used to carry a sidelink communication source identification, a destination identification and other information.

In an embodiment, for updating the DRX and/or DTX active time of the sidelink communication interface according to the indication information by the sidelink communication receiving terminal UE2, one of the following manners may be adopted specifically.

One is to start a third timer at a same time or after the sidelink communication receiving terminal UE2 receives the indication information, and the sidelink communication receiving terminal UE2 is in the DRX and/or DTX active time at the sidelink communication interface during running of the third timer. The time length of the third timer may be configured by the network or specified through a specification.

Further, the above third timer is a DRX and/or DTX inactivation timer for the sidelink communication interface.

The second is to specify in a specification that a time period between a time at which the sidelink communication receiving terminal receives the indication information and a time at which the sidelink communication receiving terminal receives the scheduling signaling corresponding to the sidelink communication interface sent by the sidelink communication transmitting terminal is the DRX and/or DTX active time of the sidelink communication interface.

Through steps 101 to 104 described above, the sidelink communication interface will be in the DRX and/or DTX active time. At this time, as shown in steps 105 and 106, the sidelink communication transmitting terminal UE1 receives, at the Uu interface, the scheduling signaling corresponding to the sidelink communication interface sent by the network device. Then the sidelink communication transmitting terminal UE1 sends the scheduling signaling corresponding to the sidelink communication interface to the sidelink communication receiving terminal UE2 based on the scheduling signaling.

The scheduling signaling corresponding to the sidelink communication interface that is sent by the sidelink communication transmitting terminal UE1 to the sidelink communication receiving terminal UE2 is based on the SCI, and the content of the SCI is determined based on the scheduling signaling that is initiated by the network device and received by the sidelink communication transmitting terminal UE1.

The above embodiments provides a method for maintaining a DRX and/or DTX state of a sidelink communication interface. By updating the DRX and/or DTX active time of the sidelink communication interface by the sidelink communication transmitting terminal after the sidelink communication transmitting terminal sends the SR or the BSR corresponding to the sidelink communication interface to the network device, and updating the DRX and/or DTX active time of the sidelink communication interface by the sidelink communication receiving terminal, the sidelink communication transmitting terminal can communicate with the sidelink communication receiving terminal through the sidelink communication interface that is in the DRX and/or DTX active time, when the sidelink communication transmitting terminal receives the resource issued by the network device, which avoids the source for the sidelink communication interface scheduled by the network device falling within the DRX and/or DTX inactive time period of the sidelink communication interface in the time domain position, thus a waste of the resource for the sidelink communication interface can be avoided.

Figure 6:
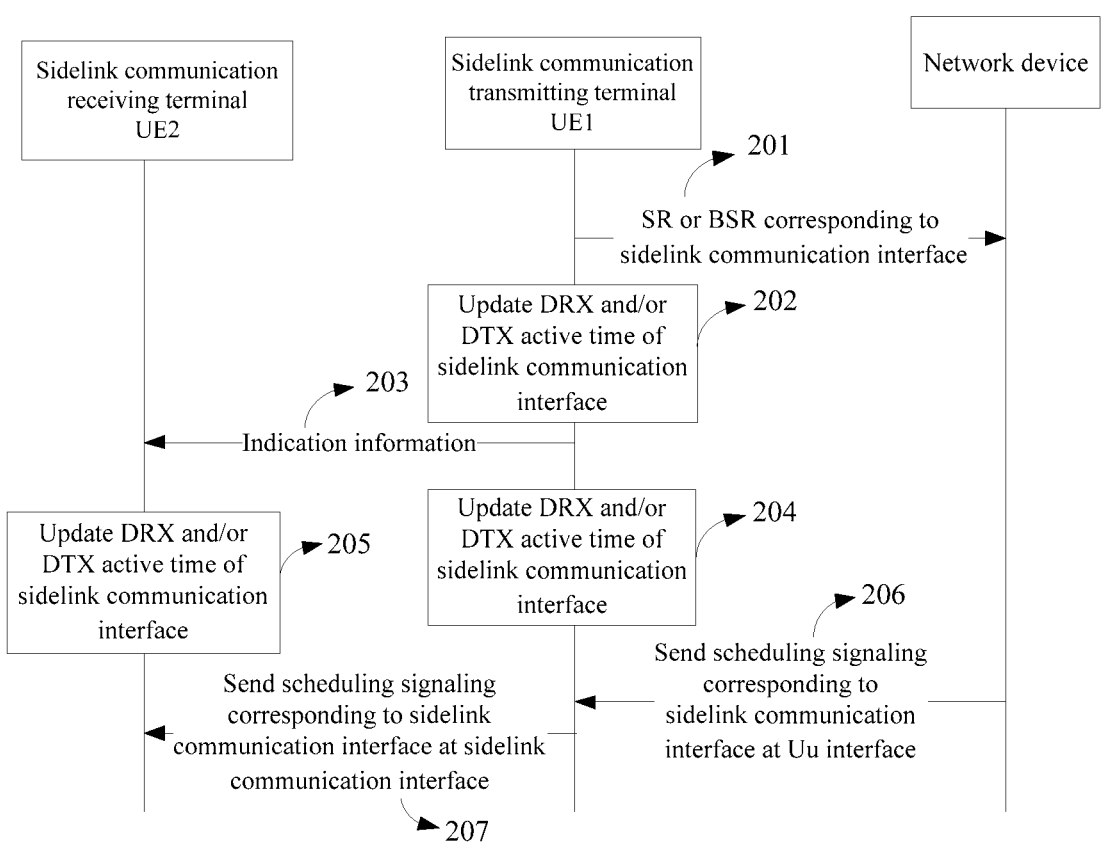
FIG. 6 is a signaling diagram of another method for maintaining a DRX and/or DTX state of a sidelink communication interface provided by the present application.

On the basis of the embodiments, FIG. 6 is a signaling diagram of another method for maintaining a DRX and/or DTX state of a sidelink communication interface provided by the present application. As shown in FIG. 6, the method includes:

> step 201, a sidelink communication transmitting terminal sends an SR or a BSR corresponding to a sidelink communication interface to a network device;
>
> step 202, the sidelink communication transmitting terminal updates DRX and/or DTX active time of the sidelink communication interface;
>
> step 203, the sidelink communication transmitting terminal sends indication information to a sidelink communication receiving terminal;
>
> step 204, the sidelink communication transmitting terminal updates the DRX and/or DTX active time of the sidelink communication interface according to the indication information;
>
> step 205, the sidelink communication receiving terminal receives the indication information and updates the DRX and/or DTX active time of the sidelink communication interface;
>
> step 206, the sidelink communication transmitting terminal receives, at a Uu interface, a scheduling signaling corresponding to the sidelink communication interface sent by the network device;
>
> step 207, the sidelink communication transmitting terminal sends, at the sidelink communication interface, the scheduling signaling corresponding to the sidelink communication interface to the sidelink communication receiving terminal.

It should be noted that similar to the embodiments, in signalings shown in FIG. 6, the sidelink communication transmitting terminal UE1 and the sidelink communication receiving terminal UE2 perform sidelink communication through the sidelink communication interface SL interface, and the sidelink communication transmitting terminal UE1 performs cellular communication with the network device through the Uu interface.

For step 201 and step 203 in FIG. 6, the sequential order of execution of the steps may be that step 201 is executed first, and then step 203 is executed (as shown in FIG. 6); or that step 203 is executed first, and then step 201 is executed (not shown in FIG. 6); or that step 201 and step 203 are executed synchronously (not shown in FIG. 6).

In addition, for step 202 and step 203, although FIG. 6 shows the sequence between step 202 and step 203 (step 202 is executed first, and then step 203 is executed), in the actual communication process, there is no correlation between the execution timings of step 202 and step 203, and the sequence of step 202 and step 203 shown in FIG. 6 does not impose any limitation on this solution.

In some embodiments, steps 201, 202, 203, 205, 206 and 207 are similar to steps 101, 102, 103, 104, 105 and 106 in the embodiments, which will not be repeated in this embodiment.

Different from the embodiments, in step 204 of this embodiment, not only does the sidelink communication transmitting terminal UE1 update the DRX and/or DTX active time of the sidelink communication interface after sending the SR or the BSR corresponding to the sidelink communication interface to the network device, and the sidelink communication transmitting terminal UE1 is in the DRX and/or DTX active time at the sidelink communication interface within the first preset time period, but also the sidelink communication transmitting terminal UE1 sends the indication information to the sidelink communication receiving terminal UE2, and updates the DRX and/or DTX active time of the sidelink communication interface according to the indication information.

FIG. 7 is a schematic flow diagram of a method for maintaining a DRX and/or DTX state of a sidelink communication interface provided by the present application, where an execution entity of a procedure of FIG. 7 is a sidelink communication transmitting terminal.

As shown in FIG. 6 in combination with FIG. 7, the sidelink communication transmitting terminal UE1 sends the indication information to the sidelink communication receiving terminal UE2 through the sidelink communication interface, and the sidelink communication transmitting terminal UE1 updates the DRX and/or DTX active time of the sidelink communication interface, and the sidelink communication transmitting terminal UE1 is in the DRX and/or DTX active time at the sidelink communication interface within the first preset time period.

The first preset time period is similar to that described in the above embodiments, that is, the start time of the first preset time period is the sending time of the SR or the BSR; the end time of the first preset time period is the receiving time at which the sidelink communication transmitting terminal receives the scheduling signaling corresponding to the sidelink communication interface sent by the network device or the time at which the sidelink communication transmitting terminal sends the sidelink communication interface control information SCI to the sidelink communication receiving terminal through the sidelink communication interface.

In an embodiment, after the sidelink communication transmitting terminal UE1 sends the indication information to the sidelink communication receiving terminal UE2, for updating the DRX and/or DTX active time of the sidelink communication interface by the sidelink communication transmitting terminal UE1, the specific manner may include one of the following.

One is to start a second timer at a same time or after the sidelink communication transmitting terminal UE1 sends the indication information, and the sidelink communication transmitting terminal is in the DRX and/or DTX active time at the sidelink communication interface during running of the second timer. The time length of the second timer may be configured by the network, or specified through a specification.

In a further embodiment, the second timer is a DRX and/or DTX inactivation timer for the sidelink communication interface.

The second is to specify in a specification that a time period between a time at which the sidelink communication transmitting terminal sends the indication information to the sidelink communication receiving terminal and a time at which the sidelink communication transmitting terminal sends the SCI to the sidelink communication receiving terminal is the DRX and/or DTX active time of the sidelink communication interface.

The above embodiments provide a method for maintaining a DRX and/or DTX state of a sidelink communication interface. By updating the DRX and/or DTX active time of the sidelink communication interface by the sidelink communication transmitting terminal after the sidelink communication transmitting terminal sends the SR or the BSR corresponding to the sidelink communication interface to the network device, and updating the DRX and/or DTX active time of the sidelink communication interface by the sidelink communication receiving terminal, the sidelink communication transmitting terminal can communicate with the sidelink communication receiving terminal through the sidelink communication interface that is in the DRX and/or DTX active time, when the sidelink communication transmitting terminal receives the resource issued by the network device, which avoids the source for the sidelink communication interface scheduled by the network device falling within the DRX and/or DTX inactive time period of the sidelink communication interface in the time domain position, thus a waste of the resource for the sidelink communication interface can be avoided.

FIG. 8 is a schematic structural diagram of a sidelink communication transmitting terminal provided by the present application. As shown in FIG. 8, the sidelink communication transmitting terminal includes:

a memory 820, a transceiver 800 and a processor 810:

the memory 820 is configured to store a computer program;

the transceiver 800 is configured to transmit and receive data under control of the processor 810;

the processor 810 is configured to read the computer program in the memory 820 and perform the following operations:

after the sidelink communication transmitting terminal sends a scheduling request SR or a buffer status reporting BSR corresponding to a sidelink communication interface to a network device, updating DRX and/or DTX active time of the sidelink communication interface, and the sidelink communication transmitting terminal is in the DRX and/or DTX active time at the sidelink communication interface within a first preset time period;

where a start time of the first preset time period is a sending time of the SR or the BSR;

an end time of the first preset time period is a receiving time at which the sidelink communication transmitting terminal receives a scheduling signaling corresponding to the sidelink communication interface sent by the network device or a time at which the sidelink communication transmitting terminal sends sidelink communication interface control information SCI to a sidelink communication receiving terminal through the sidelink communication interface.

In one embodiment, the processor 810 is configured to:

start a first timer at a same time or after the sidelink communication transmitting terminal sends the SR or the BSR corresponding to the sidelink communication interface to the network device, and the sidelink communication transmitting terminal is in the DRX and/or DTX active time at the sidelink communication interface during running of the first timer.

In one embodiment, the first timer is a DRX and/or DTX inactivation timer for the sidelink communication interface.

In one embodiment, the processor 810 is configured to:

specify in a specification that a time period between a time at which the sidelink communication transmitting terminal sends the SR and/or the BSR corresponding to the sidelink communication interface to the network device and a time at which the sidelink communication transmitting terminal receives the scheduling signaling corresponding to the sidelink communication interface from the network device is the DRX and/or DTX active time of the sidelink communication interface.

In one embodiment, the sidelink communication interface control information SCI that is sent by the sidelink communication transmitting terminal to the sidelink communication receiving terminal through the sidelink communication interface is SCI of a second stage.

In one embodiment, the processor 810 is further configured to:

send indication information to the sidelink communication receiving terminal through the sidelink communication interface, and the sidelink communication receiving terminal updates the DRX and/or DTX active time of the sidelink communication interface according to the indication information, and the sidelink communication receiving terminal is in the DRX and/or DTX active time at the sidelink communication interface within a second preset time period;

where the second preset time period includes at least a time at which the sidelink communication receiving terminal receives, through the sidelink communication interface, the sidelink communication interface control information SCI sent by the sidelink communication transmitting terminal.

In one embodiment, a time at which the sidelink communication transmitting terminal sends the indication information to the sidelink communication receiving terminal through the sidelink communication interface is the sending time at which the sidelink communication transmitting terminal sends the scheduling request SR or the buffer status reporting BSR.

In one embodiment, the time at which the sidelink communication transmitting terminal sends the indication information to the sidelink communication receiving terminal through the sidelink communication interface is before the sending time at which the sidelink communication transmitting terminal sends the scheduling request SR or the buffer status reporting BSR.

In one embodiment, a difference value between the time at which the sidelink communication transmitting terminal sends the indication information to the sidelink communication receiving terminal through the sidelink communication interface and the sending time at which the sidelink communication transmitting terminal sends the scheduling request SR or the buffer status reporting BSR is smaller than a first time threshold.

In one embodiment, the time at which the sidelink communication transmitting terminal sends the indication information to the sidelink communication receiving terminal through the sidelink communication interface is after the sending time at which the sidelink communication transmitting terminal sends the scheduling request SR or the buffer status reporting BSR.

In one embodiment, the difference value between the time at which the sidelink communication transmitting terminal sends the indication information to the sidelink communication receiving terminal through the sidelink communication interface and the sending time at which the sidelink communication transmitting terminal sends the scheduling request SR or the buffer status reporting BSR is smaller than a second time threshold.

In one embodiment, the indication information is sent by the sidelink communication transmitting terminal to the sidelink communication receiving terminal through a physical layer signaling or a high-layer signaling.

In one embodiment, the indication information is sent through the sidelink communication interface control information SCI, where the SCI does not include scheduling information for a sidelink communication resource, and is only used to prolong time when the sidelink communication receiving terminal is in the DRX and/or DTX active time at the sidelink communication interface.

In one embodiment, the indication information is sent by the sidelink communication transmitting terminal at the DRX and/or DTX active time in which the sidelink communication interface is.

In one embodiment, a trigger condition for sending the indication information is that the sidelink communication transmitting terminal predicts that the sidelink communication receiving terminal will enter a DRX and/or DTX silent period before receiving the SCI.

In one embodiment, the processor 810 is further configured to:

after the sidelink communication transmitting terminal sends the indication information to the sidelink communication receiving terminal, update the DRX and/or DTX active time of the sidelink communication interface, and the sidelink communication transmitting terminal is in the DRX and/or DTX active time at the sidelink communication interface within the first preset time period.

In one embodiment, the processor 810 is configured to:

start a second timer at a same time or after sending the indication information, and the sidelink communication transmitting terminal is in the DRX and/or DTX active time at the sidelink communication interface during running of the second timer.

In one embodiment, the second timer is a DRX and/or DTX inactivation timer for the sidelink communication interface.

In one embodiment, the processor 810 is configured to:

specify in a specification that a time period between a time at which the sidelink communication transmitting terminal sends the indication information to the sidelink communication receiving terminal and a time at which the sidelink communication transmitting terminal sends the SCI to the sidelink communication receiving terminal is the DRX and/or DTX active time of the sidelink communication interface.

In FIG. 8, a bus architecture may include any number of interconnected buses and bridges, specifically, various circuits of one or more processors represented by the processor 810 and the memory represented by the memory 820 are linked together. The bus architecture may also link together various other circuits such as peripherals, voltage regulators and power management circuits, which are well known in the art and therefore will not be further described herein. A bus interface provides an interface. The transceiver 800 may be a plurality of elements, i.e., including a transmitter and a receiver, providing devices for communicating with various other apparatuses over transmission media including wireless channels, wired channels, fiber optic cables, etc. For different user devices, a user interface may also be an interface capable of connecting externally and internally to required devices, and the connected devices include but are not limited to a keypad, a display, a speaker, a microphone, a joystick, etc.

The processor 810 is responsible for managing the bus architecture and general processing, and the memory 820 may store data used by the processor 810 when performing operations.

In one embodiment, the processor 810 may be a CPU (central processing unit), an ASIC (Application Specific Integrated Circuit), an FPGA (Field-Programmable Gate Array) or a CPLD (Complex Programmable Logic Device), and the processor may also adopt a multi-core architecture.

The processor 810 is configured to execute any one of the methods provided by the embodiments of the present application according to the obtained executable instructions by calling the computer program stored in the memory. The processor and the memory may also be physically separated.

It should be noted here that the above apparatus provided by the present application is capable of implementing all the method steps implemented in the above method embodiments and is capable of achieving the same effect. The parts and beneficial effects of this embodiment which are same as those in the method embodiments will not be described in detail here.

FIG. 9 is a schematic structural diagram of a sidelink communication receiving terminal provided by the present application, which, as shown in FIG. 9, includes:

a memory 920, a transceiver 900 and a processor 910:

the memory 920 is configured to store a computer program;

the transceiver 900 is configured to transmit and receive data under control of the processor 910;

the processor 910 is configured to read the computer program in the memory 920 and execute the following operations:

receiving, through a sidelink communication interface, indication information sent by the sidelink communication transmitting terminal; updating DRX and/or DTX active time of the sidelink communication interface according to the indication information, and the sidelink communication receiving terminal is in the DRX and/or DTX active time at the sidelink communication interface within a second preset time period;

where the second preset time period includes at least a time at which the sidelink communication receiving terminal receives, through the sidelink communication interface, sidelink communication interface control information SCI sent by the sidelink communication transmitting terminal.

In an embodiment, the sidelink communication interface control information SCI that is sent by the sidelink communication transmitting terminal and received by the sidelink communication receiving terminal through the sidelink communication interface is SCI of a second stage. Similar to the SCI in the foregoing embodiments, the current sidelink communication interface SCI includes two parts, where a first stage SCI (stage-1 SCI) is used to transmit indication information of a time/frequency domain resource, and a second stage SCI (stage-2 SCI) is used to carry a sidelink communication source identification, a destination identification and other information.

In one embodiment, the processor 910 is configured to:

start a third timer at a same time or after receiving the indication information, and the sidelink communication receiving terminal is in the DRX and/or DTX active time at the sidelink communication interface during running of the third timer.

In one embodiment, the third timer is a DRX and/or DTX inactivation timer for the sidelink communication interface.

In one embodiment, the processor 910 is configured to:

specify in a specification that a time period between a time at which the sidelink communication receiving terminal receives the indication information and a time at which the sidelink communication receiving terminal receives a scheduling signaling corresponding to the sidelink communication interface sent by the sidelink communication transmitting terminal is the DRX and/or DTX active time of the sidelink communication interface.

In FIG. 9, a bus architecture may include any number of interconnected buses and bridges, specifically, various circuits of one or more processors represented by the processor

910 and the memory represented by the memory 920 are linked together. The bus architecture may also link together various other circuits such as peripherals, voltage regulators and power management circuits, which are well known in the art and therefore will not be further described herein. A bus interface provides an interface. The transceiver 900 may be a plurality of elements, i.e., including a transmitter and a receiver, providing devices for communicating with various other apparatuses over transmission media including wireless channels, wired channels, fiber optic cables, etc. For different user devices, a user interface may also be an interface capable of connecting externally and internally to required devices, and the connected devices include but are not limited to a keypad, a display, a speaker, a microphone, a joystick, etc.

The processor 910 is responsible for managing the bus architecture and general processing, and the memory 920 may store data used by the processor 900 when performing operations.

In one embodiment, the processor 910 may be a CPU (central processing unit), an ASIC (Application Specific Integrated Circuit), an FPGA (Field-Programmable Gate Array) or a CPLD (Complex Programmable Logic Device), and the processor may also adopt a multi-core architecture.

The processor 910 is configured to execute any one of the methods provided by the embodiments of the present application according to the obtained executable instructions by calling the computer program stored in the memory. The processor and the memory may also be physically separated.

It should be noted here that the above apparatus provided by the present application is capable of implementing all the method steps implemented in the above method embodiments and is capable of achieving the same effect. The parts and beneficial effects of this embodiment which are same as those in the method embodiments will not be described in detail here.

Figure 10:
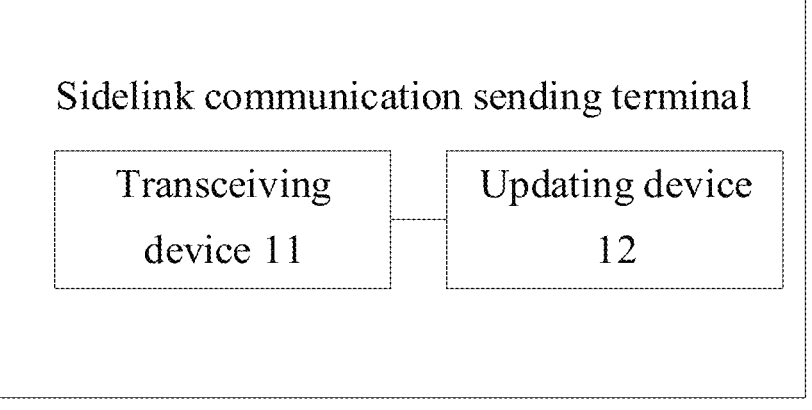
FIG. 10 is a schematic structural diagram of another sidelink communication transmitting terminal provided by the present application.

FIG. 10 is a schematic structural diagram of another sidelink communication transmitting terminal provided by the present application. As shown in FIG. 10, the sidelink communication transmitting terminal includes:

a transceiving device 11, configured to send a scheduling request SR or a buffer status reporting BSR corresponding to a sidelink communication interface to a network device;

an updating device 12, configured to update DRX and/or DTX active time of the sidelink communication interface, and the sidelink communication transmitting terminal is in the DRX and/or DTX active time at the sidelink communication interface within a first preset time period;

where a start time of the first preset time period is a sending time of the SR or the BSR;

an end time of the first preset time period is a receiving time at which the sidelink communication transmitting terminal receives a scheduling signaling corresponding to the sidelink communication interface sent by the network device or a time at which the sidelink communication transmitting terminal sends sidelink communication interface control information SCI to a sidelink communication receiving terminal through the sidelink communication interface.

In one embodiment, the updating device 12 is configured to:

start a first timer at a same time or after the sidelink communication transmitting terminal sends the SR or the BSR corresponding to the sidelink communication interface to the network device, and the sidelink communication transmitting terminal is in the DRX and/or DTX active time at the sidelink communication interface during running of the first timer.

In one embodiment, the first timer is a DRX and/or DTX inactivation timer for the sidelink communication interface.

In one embodiment, the updating device 12 is configured to:

specify in a specification that a time period between a time at which the sidelink communication transmitting terminal sends the SR and/or the BSR corresponding to the sidelink communication interface to the network device and a time at which the sidelink communication transmitting terminal receives the scheduling signaling corresponding to the sidelink communication interface from the network device is the DRX and/or DTX active time of the sidelink communication interface.

In one embodiment, the transceiving device 11 is further configured to send indication information to the sidelink communication receiving terminal through the sidelink communication interface, and the sidelink communication receiving terminal updates the DRX and/or DTX active time of the sidelink communication interface according to the indication information, and the sidelink communication receiving terminal is in the DRX and/or DTX active time at the sidelink communication interface within a second preset time period;

where the second preset time period includes at least a time at which the sidelink communication receiving terminal receives, through the sidelink communication interface, the sidelink communication interface control information SCI sent by the sidelink communication transmitting terminal.

In one embodiment, the time at which the sidelink communication transmitting terminal sends the indication information to the sidelink communication receiving terminal through the sidelink communication interface is the sending time at which the sidelink communication transmitting terminal sends the scheduling request SR or the buffer status reporting BSR.

In one embodiment, the time at which the sidelink communication transmitting terminal sends the indication information to the sidelink communication receiving terminal through the sidelink communication interface is before the sending time at which the sidelink communication transmitting terminal sends the scheduling request SR or the buffer status reporting BSR.

In one embodiment, a difference value between the time at which the sidelink communication transmitting terminal sends the indication information to the sidelink communication receiving terminal through the sidelink communication interface and the sending time at which the sidelink communication transmitting terminal sends the scheduling request SR or the buffer status reporting BSR is smaller than a first time threshold.

In one embodiment, the time at which the sidelink communication transmitting terminal sends the indication information to the sidelink communication receiving terminal through the sidelink communication interface is after the sending time at which the sidelink communication transmitting terminal sends the scheduling request SR or the buffer status reporting BSR.

In one embodiment, a difference value between the time at which the sidelink communication transmitting terminal sends the indication information to the sidelink communication receiving terminal through the sidelink communication interface and the sending time at which the sidelink communication transmitting terminal sends the scheduling request SR or the buffer status reporting BSR is smaller than a second time threshold.

In one embodiment, the indication information is sent by the sidelink communication transmitting terminal to the sidelink communication receiving terminal through a physical layer signaling or a high-layer signaling.

In one embodiment, when the indication information is sent by the sidelink communication transmitting terminal to the sidelink communication receiving terminal through the physical layer signaling, the indication information is sent through the sidelink communication interface control information SCI, where the SCI does not include scheduling information for a sidelink communication resource, and is only used to prolong time when the sidelink communication receiving terminal is in the DRX and/or DTX active time at the sidelink communication interface.

In one embodiment, the indication information is sent by the sidelink communication transmitting terminal at the DRX and/or DTX active time of the sidelink communication interface is.

In one embodiment, a trigger condition for sending the indication information is that the sidelink communication transmitting terminal predicts that the sidelink communication receiving terminal will enter a DRX and/or DTX silent period before receiving the SCI.

In one embodiment, the updating device 12 is further configured to: after the transceiving device 11 sends the indication information to the sidelink communication receiving terminal, update the DRX and/or DTX active time of the sidelink communication interface, and the sidelink communication transmitting terminal is in the DRX and/or DTX active time at the sidelink communication interface within the first preset time period.

In one embodiment, the updating device 12 is configured to: start a second timer at a same time or after sending the indication information, and the sidelink communication transmitting terminal is in the DRX and/or DTX active time at the sidelink communication interface during running of the second timer.

In one embodiment, the second timer is a DRX and/or DTX inactivation timer for the sidelink communication interface.

In one embodiment, the updating device 12 is configured to: specify in a specification that a time period between a time at which the sidelink communication transmitting terminal sends the indication information to the sidelink communication receiving terminal and a time at which the sidelink communication transmitting terminal sends the SCI to the sidelink communication receiving terminal is the DRX and/or DTX active time of the sidelink communication interface.

It should be noted that the division of devices in the embodiments of the present application is illustrative and is only a logical function division, and there may be other division manners in actual embodiments. In addition, the functional devices in the embodiments of the present application may be integrated in a single processing device, or each device may be physically present separately, or two or more devices may be integrated in a single device. The above integrated devices may be implemented either in the form of hardware or in the form of software functional units.

It should be noted here that, the above apparatus provided by the present application is capable of implementing all the method steps implemented in the above method embodiments and is capable of achieving the same effect. The parts and beneficial effects of this embodiment which are same as those in the method embodiments will not be described in detail here.

The integrated devices may be stored in a processor-readable storage medium when implemented in the form of software function units and sold or used as an independent product. Based on such understanding, embodiments of the present application in essence, or the part of the embodiments which makes a contribution to the prior art, or all or part of the technical solution may be embodied in the form of a software product. The computer software product is stored in a storage medium, including several instructions for causing a computer device (which may be a personal computer, a server, or a network device, etc.) or a processor to execute all or part of the steps of the methods in the various embodiments of the present application. The aforementioned storage medium includes various media that can store program codes, such as a U disk, a mobile hard disk, a read-only memory (ROM), a random access memory (RAM), a magnetic disk or an optical disk.

Figure 11:
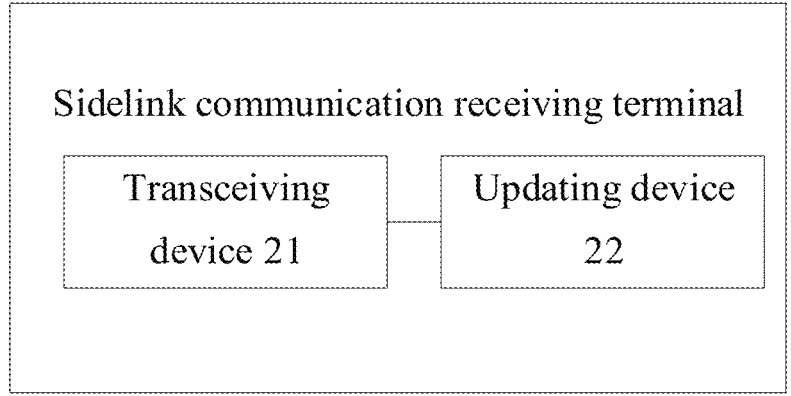
FIG. 11 is a schematic structural diagram of another sidelink communication receiving terminal provided by the present application.

FIG. 11 is a schematic structural diagram of another sidelink communication receiving terminal provided by the present application. As shown in FIG. 11, the sidelink communication receiving terminal includes:

a transceiving device 21, configured to receive, through a sidelink communication interface, indication information sent by a sidelink communication transmitting terminal;

an updating device 22, configured to update DRX and/or DTX active time of the sidelink communication interface according to the indication information, and the sidelink communication receiving terminal is in the DRX and/or DTX active time at the sidelink communication interface within a second preset time period;

where the second preset time period includes at least a time at which the sidelink communication receiving terminal receives, through the sidelink communication interface, sidelink communication interface control information SCI sent by the sidelink communication transmitting terminal.

In one embodiment, the updating device 22 is configured to:

start a third timer at a same time or after receiving the indication information, and the sidelink communication receiving terminal is in the DRX and/or DTX active time at the sidelink communication interface during running of the third timer.

In one embodiment, the third timer is a DRX and/or DTX inactivation timer for the sidelink communication interface.

In one embodiment, the updating device 22 is configured to:

specify in a specification that a time period between a time at which the sidelink communication receiving terminal receives the indication information and a time at which the sidelink communication receiving terminal receives a scheduling signaling corresponding to the sidelink communication interface sent by the sidelink communication transmitting terminal is the DRX and/or DTX active time of the sidelink communication interface.

It should be noted here that the above apparatus provided by the present application is capable of implementing all the method steps implemented in the above method embodiments and is capable of achieving the same effect. The parts and beneficial effects of this embodiment which are same as those in the method embodiments will not be described in detail here.

It should be noted that the division of devices in the embodiments of the present application is illustrative and is only a logical function division, and there may be other division manners in actual embodiments. In addition, the functional devices in the embodiments of the present application may be integrated in a single processing device, or each device may be physically present separately, or two or more devices may be integrated in a single device. The above integrated devices may be implemented either in the form of hardware or in the form of software functional units.

The integrated devices may be stored in a processor-readable storage medium when implemented in the form of software function units and sold or used as an independent product. Based on such understanding, embodiments of the present application in essence, or the part of the embodiments which makes a contribution to the prior art, or all or part of the embodiments may be embodied in the form of a software product. The computer software product is stored in a storage medium, including several instructions for causing a computer device (which may be a personal computer, a server, or a network device, etc.) or a processor to execute all or part of the steps of the methods in the various embodiments of the present application. The aforementioned storage medium includes various media that can store program codes, such as a U disk, a mobile hard disk, a read-only memory (ROM), a random access memory (RAM), a magnetic disk or an optical disk.

The present application also provides a processor-readable storage medium. The processor-readable storage medium stores a computer program, and the computer program is used to cause the processor to execute the method described in the embodiments.

The processor-readable storage medium may be any available medium or data storage device that can be accessed by a processor, including but not limited to a magnetic storage (such as a floppy disk, a hard disk, a magnetic tape, a magneto-optical disk (MO), etc.), an optical storage (such as a CD, a DVD, a BD, an HVD, etc.), and a semiconductor storage (such as a ROM, an EPROM, an EEPROM, a non-volatile memory (NAND FLASH), a solid state disk (SSD)), etc.

In addition, the present application provides a computer program product, including a computer program. When the computer program is executed by a processor, the steps of the method described in the embodiments described above are implemented.

The embodiments of the present application may be provided as methods, systems, or computer program products. Accordingly, the present application may take the form of an entirely hardware embodiment, an entirely software embodiment or an embodiment combining software and hardware aspects. Also, the present application may take the form of a computer program product embodied on one or more computer-usable storage media (including but not limited to a disk storage and an optical storage, etc.) containing computer-usable program codes therein.

The present application is described with reference to flowcharts and/or block diagrams of methods, devices (systems), and computer program products according to the embodiments of the present application. It should be understood that each procedure and/or block in the flowcharts and/or block diagrams, and combinations of procedures and/or blocks in the flowcharts and/or block diagrams may be implemented by the computer-executable instructions. These computer-executable instructions may be provided to a processor of a general-purpose computer, a special-purpose computer, an embedded processor, or other programmable data processing devices to produce a machine, and an apparatus for implementing a function specified in one or more procedures of the flowcharts and/or one or more blocks of the block diagrams may be produced via the instructions executed by the processor of the computer or other programmable data processing devices.

These processor-executable instructions may also be stored in a processor-readable memory capable of directing a computer or other programmable data processing devices to operate in a specific manner, and the instructions stored in the processor-readable memory produce a manufacturing product including an instruction apparatus, where the instruction apparatus implements the function specified in one or more procedures of the flow charts and/or one or more blocks of the block diagrams.

These processor-executable instructions may also be loaded onto a computer or other programmable data processing devices, and a series of operational steps are performed on the computer or other programmable devices to produce computer-implemented processing. Therefore, the instructions executed on the computer or other programmable devices provide steps for implementing the functions specified in one or more procedures of the flowcharts and/or one or more blocks of the block diagrams.

The invention claimed is:

1. A method for maintaining a discontinuous reception (DRX) and/or discontinuous transmission (DTX) state of a sidelink communication interface, comprising:

after a sidelink communication transmitting terminal sends a scheduling request (SR) or a buffer status reporting (BSR) corresponding to a sidelink communication interface to a network device, updating, by the sidelink communication transmitting terminal, DRX and/or DTX active time of the sidelink communication interface, and the sidelink communication transmitting terminal is in the DRX and/or DTX active time at the sidelink communication interface within a first preset time period;

wherein a start time of the first preset time period is a sending time of the SR or the BSR;

an end time of the first preset time period is a receiving time at which the sidelink communication transmitting terminal receives a scheduling signaling corresponding to the sidelink communication interface sent by the network device or a time at which the sidelink communication transmitting terminal sends sidelink control information (SCI) to a sidelink communication receiving terminal through the sidelink communication interface.

2. The method according to claim 1, wherein the updating, by the sidelink communication transmitting terminal, the DRX and/or DTX active time of the sidelink communication interface comprises:

starting a first timer at a same time or after the sidelink communication transmitting terminal sends the SR or the BSR corresponding to the sidelink communication interface to the network device, and the sidelink communication transmitting terminal is in the DRX and/or DTX active time at the sidelink communication interface during running of the first timer; or specifying in a specification that a time period between a time at which the sidelink communication transmitting terminal sends the SR and/or the BSR corresponding to the sidelink communication interface to the network device and a time at which the sidelink communication transmitting terminal receives the scheduling signaling corresponding to the sidelink communication interface from the network device is the DRX and/or DTX active time of the sidelink communication interface.

3. The method according to claim 1, wherein the SCI that is sent by the sidelink communication transmitting terminal to the sidelink communication receiving terminal through the sidelink communication interface is SCI of a second stage.

4. The method according to claim 1, further comprising: sending, by the sidelink communication transmitting terminal, indication information to the sidelink communication receiving terminal through the sidelink communication interface, and the sidelink communication receiving terminal updates the DRX and/or DTX active time of the sidelink communication interface according to the indication information, and the sidelink communication receiving terminal is in the DRX and/or DTX active time at the sidelink communication interface within a second preset time period;

wherein the second preset time period comprises at least a time at which the sidelink communication receiving terminal receives, through the sidelink communication interface, the SCI sent by the sidelink communication transmitting terminal.

5. The method according to claim 4, wherein a time at which the sidelink communication transmitting terminal sends the indication information to the sidelink communication receiving terminal through the sidelink communication interface is the sending time at which the sidelink communication transmitting terminal sends the SR or the BSR;

or, a time at which the sidelink communication transmitting terminal sends the indication information to the sidelink communication receiving terminal through the sidelink communication interface is before the sending time at which the sidelink communication transmitting terminal sends the SR or the BSR; wherein a difference value between the time at which the sidelink communication transmitting terminal sends the indication information to the sidelink communication receiving terminal through the sidelink communication interface and the sending time at which the sidelink communication transmitting terminal sends the SR or the BSR is smaller than a first time threshold;

or, a time at which the sidelink communication transmitting terminal sends the indication information to the sidelink communication receiving terminal through the sidelink communication interface is after the sending time at which the sidelink communication transmitting terminal sends the SR or the BSR; wherein a difference value between the time at which the sidelink communication transmitting terminal sends the indication information to the sidelink communication receiving terminal through the sidelink communication interface and the sending time at which the sidelink communication transmitting terminal sends the SR or the BSR is smaller than a second time threshold.

6. The method according to claim 4, wherein the indication information is sent by the sidelink communication transmitting terminal to the sidelink communication receiving terminal through a physical layer signaling or a high-layer signaling; and when the indication information is sent by the sidelink communication transmitting terminal to the sidelink communication receiving terminal through the physical layer signaling, the indication information is sent through the SCI, wherein the SCI does not include scheduling information for a sidelink communication resource, and is only used to prolong time when the sidelink communication receiving terminal is in the DRX and/or DTX active time at the sidelink communication interface.

7. The method according to claim 4, wherein the indication information is sent by the sidelink communication transmitting terminal at the DRX and/or DTX active time of the sidelink communication interface.

8. The method according to claim 4, wherein a trigger condition for sending the indication information is that the sidelink communication transmitting terminal predicts that the sidelink communication receiving terminal enters a DRX and/or DTX silent period before receiving the SCI.

9. The method according to claim 4, further comprising: after the sidelink communication transmitting terminal sends the indication information to the sidelink communication receiving terminal, updating, by the sidelink communication transmitting terminal, the DRX and/or DTX active time of the sidelink communication interface, and the sidelink communication transmitting terminal is in the DRX and/or DTX active time at the sidelink communication interface within the first preset time period.

10. The method according to claim 9, wherein after the sidelink communication transmitting terminal sends the indication information to the sidelink communication receiving terminal, updating, by the sidelink communication transmitting terminal, the DRX and/or DTX active time of the sidelink communication interface comprises:

starting, by the sidelink communication transmitting terminal, a second timer at a same time or after sending the indication information, and the sidelink communication transmitting terminal is in the DRX and/or DTX active time at the sidelink communication interface during running of the second timer; or, specifying in a specification that a time period between a time at which the sidelink communication transmitting terminal sends the indication information to the sidelink communication receiving terminal and a time at which the sidelink communication transmitting terminal sends the SCI to the sidelink communication receiving terminal is the DRX and/or DTX active time of the sidelink communication interface.

11. A method for maintaining a discontinuous reception (DRX) and/or discontinuous transmission (DTX) state of a sidelink communication interface, comprising:

receiving, by a sidelink communication receiving terminal and through a sidelink communication interface, indication information sent by a sidelink communication transmitting terminal;

updating, by the sidelink communication receiving terminal, DRX and/or DTX active time of the sidelink communication interface according to the indication information, and the sidelink communication receiving terminal is in the DRX and/or DTX active time at the sidelink communication interface within a second preset time period;

wherein the second preset time period comprises at least a time at which the sidelink communication receiving terminal receives, through the sidelink communication interface, sidelink control information (SCI) sent by the sidelink communication transmitting terminal.

12. The method according to claim 11, wherein the updating, by the sidelink communication receiving terminal, the DRX and/or DTX active time of the sidelink communication interface according to the indication information comprises:

starting, by the sidelink communication receiving terminal, a third timer at a same time or after receiving the indication information, and the sidelink communication receiving terminal is in the DRX and/or DTX active time at the sidelink communication interface during running of the third timer; or specifying in a specification that a time period between a time at which the sidelink communication receiving terminal receives the indication information and a time at which the sidelink communication receiving terminal receives a scheduling signaling corresponding to the sidelink communication interface sent by the sidelink communication transmitting terminal is the DRX and/or DTX active time of the sidelink communication interface.

13. The method according to claim 11, wherein the SCI that is sent by the sidelink communication transmitting terminal and received by the sidelink communication receiving terminal through the sidelink communication interface is SCI of a second stage.

14. A sidelink communication transmitting terminal, comprising a memory, a transceiver and a processor;

wherein the memory is configured to store a computer program; the transceiver is configured to transmit and receive data under control of the processor; the processor is configured to read the computer program in the memory and execute the following operations:

after the sidelink communication transmitting terminal sends a scheduling request (SR) or a buffer status reporting (BSR) corresponding to a sidelink communication interface to a network device, updating discontinuous reception (DRX) and/or discontinuous transmission (DTX) active time of the sidelink communication interface, and the sidelink communication transmitting terminal is in the DRX and/or DTX active time at the sidelink communication interface within a first preset time period;

wherein a start time of the first preset time period is a sending time of the SR or the BSR;

an end time of the first preset time period is a receiving time at which the sidelink communication transmitting terminal receives a scheduling signaling corresponding to the sidelink communication interface sent by the network device or a time at which the sidelink communication transmitting terminal sends sidelink control information (SCI) to a sidelink communication receiving terminal through the sidelink communication interface.

15. The sidelink communication transmitting terminal according to claim 14, wherein the processor is configured to:

start a first timer at a same time or after the sidelink communication transmitting terminal sends the SR or the BSR corresponding to the sidelink communication interface to the network device, and the sidelink communication transmitting terminal is in the DRX and/or DTX active time at the sidelink communication interface during running of the first timer; wherein the first timer is a DRX and/or DTX inactivation timer for the sidelink communication interface;

or, specify in a specification that a time period between a time at which the sidelink communication transmitting terminal sends the SR and/or the BSR corresponding to the sidelink communication interface to the network device and a time at which the sidelink communication transmitting terminal receives the scheduling signaling corresponding to the sidelink communication interface from the network device is the DRX and/or DTX active time of the sidelink communication interface.

16. The sidelink communication transmitting terminal according to claim 14, wherein the processor is further configured to:

send indication information to the sidelink communication receiving terminal through the sidelink communication interface, and the sidelink communication receiving terminal updates the DRX and/or DTX active time of the sidelink communication interface according to the indication information, and the sidelink communication receiving terminal is in the DRX and/or DTX active time at the sidelink communication interface within a second preset time period;

wherein the second preset time period comprises at least a time at which the sidelink communication receiving terminal receives, through the sidelink communication interface, the SCI sent by the sidelink communication transmitting terminal.

17. The sidelink communication transmitting terminal according to claim 16, wherein a time at which the sidelink communication transmitting terminal sends the indication information to the sidelink communication receiving terminal through the sidelink communication interface is the sending time at which the sidelink communication transmitting terminal sends the SR or the BSR;

or, a time at which the sidelink communication transmitting terminal sends the indication information to the sidelink communication receiving terminal through the sidelink communication interface is before the sending time at which the sidelink communication transmitting terminal sends the SR or the BSR; wherein a difference value between the time at which the sidelink communication transmitting terminal sends the indication information to the sidelink communication receiving terminal through the sidelink communication interface and the sending time at which the sidelink communication transmitting terminal sends the SR or the BSR is smaller than a first time threshold;

or, a time at which the sidelink communication transmitting terminal sends the indication information to the sidelink communication receiving terminal through the sidelink communication interface is after the sending time at which the sidelink communication transmitting terminal sends the SR or the BSR; wherein a difference value between the time at which the sidelink communication transmitting terminal sends the indication information to the sidelink communication receiving terminal through the sidelink communication interface and the sending time at which the sidelink communication transmitting terminal sends the SR or the BSR is smaller than a second time threshold.

18. A sidelink communication receiving terminal, comprising a memory, a transceiver and a processor;

wherein the memory is configured to store a computer program; the transceiver is configured to transmit and receive data under control of the processor; the processor is configured to read the computer program in the memory and execute the method according to claim 11.

19. A non-transitory processor-readable storage medium, wherein the processor-readable storage medium stores a computer program therein, and the computer program is used to cause a processor to execute the method according to claim 1.

20. A non-transitory processor-readable storage medium, wherein the processor-readable storage medium stores a computer program therein, and the computer program is used to cause a processor to execute the method according to claim 11.

* * * * *